Sept. 19, 1939.  H. H. C. PETERS  2,173,632
DOUGH-COILING DEVICE
Filed Dec. 19, 1938  2 Sheets-Sheet 1

Inventor
H. H. C. Peters
By C. F. Wenderoth
Attorney

Sept. 19, 1939.　　　H. H. C. PETERS　　　2,173,632
DOUGH-COILING DEVICE
Filed Dec. 19, 1938　　　2 Sheets-Sheet 2
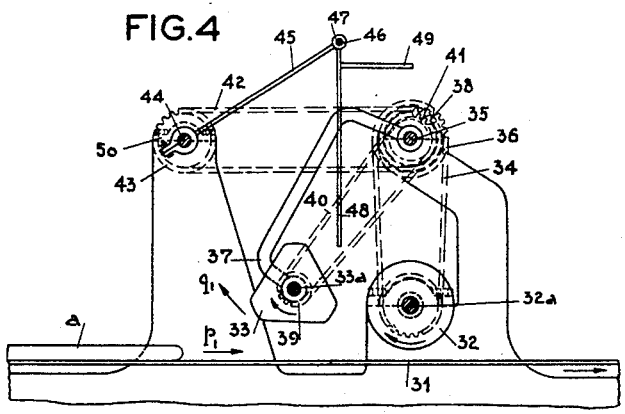
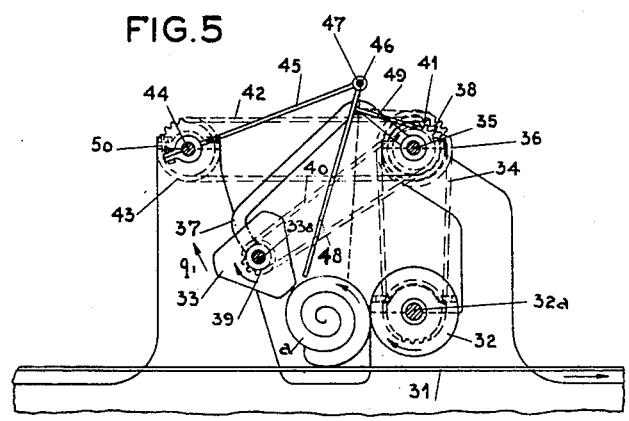
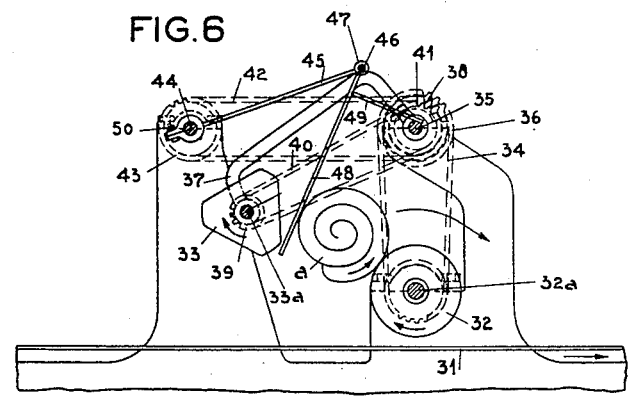
Inventor
H. H. C. Peters
By E. F. Wentworth
Attorney Patented Sept. 19, 1939

2,173,632

UNITED STATES PATENT OFFICE 2,173,632

DOUGH-COILING DEVICE

Hendrik Herman Christiaan Peters, Rotterdam, Netherlands

Application December 19, 1938, Serial No. 246,743
In the Netherlands December 21, 1937

6 Claims. (Cl. 107—9)

My invention relates to improvements in dough coiling devices for loaf-forming machines in which sheets of dough have to be coiled.

In one type of these coiling devices hitherto known coiling rollers are provided which together with a movable carrier for the dough sheets constitute a coiling chamber and in whch the coils are caused to leave said chamber at equal intervals predetermined by the machine drive.

Due to the fact that the size and the properties of the successive dough sheets to be coiled generally differ the quality of the dough coils obtained by such machines is not constantly the same.

The object of the invention is a coiling device in which coiling is effected in such a manner that coils of constant, perfect quality are obtained and in which the end of the coiling operation is determined by the growing coil itself.

Another object of the invention is to provide a simple and efficient device for producing coils of perfectly constant quality at a very high speed e. g. of 3000 coils an hour.

With the above and other objects in view the invention consists in a device embodying the novel and improved features, hereinafter described and particularly pointed out in the claims.

In the drawings two examples of a device according to the invention are shown.

Figs. 4, 5 and 6 show similar side elevations of a further example of a device according to the invention.

Figure 1:
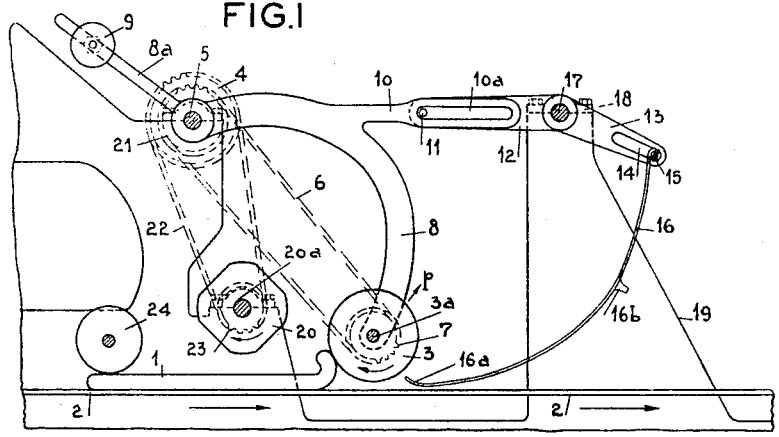
Figs. 1, 2 and 3 show side elevations of the first example of the device in three different positions.

In the drawings it is to be assumed that flat sheets of dough 1 are supplied successively from the left side of the figure by the carrier 2 and conveyed onwards to a flattening roller 24. In Fig. 1: after having passed that roller the sheet 1 comes into contact with a roller 3 driven in clockwise direction. This roller 3 is driven in this example from the chain wheel 4 on the shaft 5 by means of a chain 6 and the chain wheel 7.

The shaft 3a of the roller 3 is supported in a lever 8 (generally a pair of levers, one at each side of the shaft). Said lever 8 is pivoted to the shaft 5, so as to be freely rotatable about that shaft.

The arm 8a of the lever 8 carries a counterweight 9, which is so adjusted that the lever 8 and the roller 3 are substantially balanced.

A pin 11 on an arm 12 extends in a slot 10a of an extending part 10 of the lever 8.

The arm 12 forms part of a lever, the other arm 13 of which is provided with a slot 14 in which a pin 15 fast to a shielding member 16 is movable.

The member 16 is shaped as a plate, which extends along the width of the carrier 2. At both sides the member 16 is supported by means of pins 15 in arms 13. The levers 12—13 at both sides of the plate 16 are pivoted to the shaft 17, which is journalled in a stationary bearing 18 of the machine frame 19.

A roller 20 is driven in clockwise direction from a chain wheel 21 on the shaft 5 by means of a chain 22 and a chain wheel 23.

The gearing is such that the speed of the roller 20 is greater than that of roller 3 and than that of the carrier 2. The cross-section of roller 20 is polygonal or angular.

The shaft 20a of roller 20 is journalled in a bearing of the frame. This bearing is in operation stationary, but it may be adjustably mounted according to the nature and size of the sheet of dough to be handled.

In operation the sheet of dough 1 is fed against the roller 3. The coiling operation is initiated by the roller 3 and then finished by the roller 20. Due to the polygonal section and the greater peripheral speed of the roller 20 during coiling the dough is treated in a very good manner, because the roller 20 during coiling periodically exerts some pressure on the dough, so that the sheet is lightly coiled. During coiling the roller 3 by the growing coil is moved away in the direction of the arrow p (Fig. 1).

The arm 13 is lowered and the somewhat curled end 16a of the plate 16 is moved towards the coil in the coiling space between the rollers 3, 20 and the carrier 2.

Figure 2:
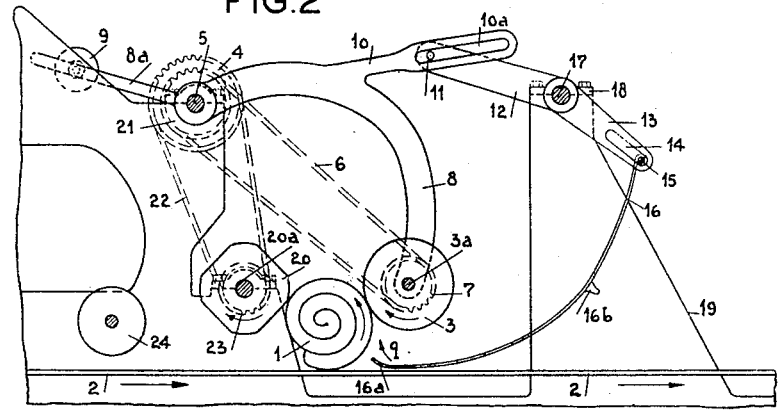
Figure 3:
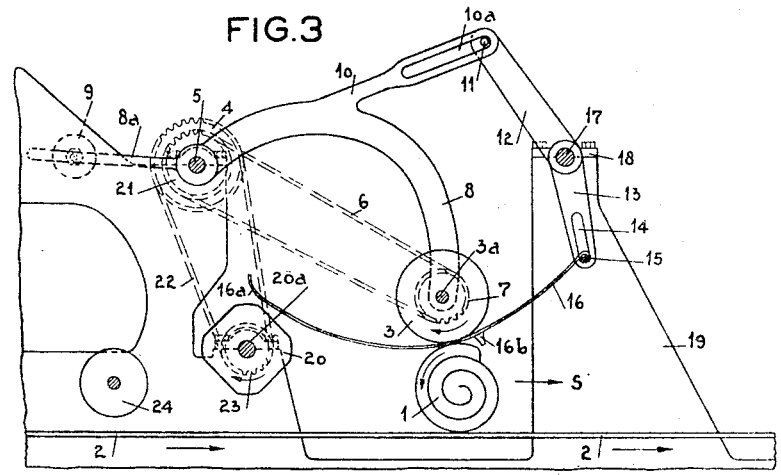

When the coil is almost ready, the end 16a contacts the periphery of the coil and is driven by the rotating coil in the direction of the arrow q (Fig. 2) until the position according to Figure 3 is reached. It is useful that the end 16a of the plate 16 is picked up by the lower side of the coil, because then the roller 3 has just time to attend to coiling the last part of the dough sheet, so that said roller 3 does not prematurely leave the coil. Finally the coil is out of contact with the roller 3 and the carrier 2 carries the coil off the coiling space. The coil passes below the plate 16 in the direction of the arrow s (Fig. 3).

In doing so the coil may hit a stop 16b fast to the plate 16, so that the mechanism easily returns in its initial position.

It will be clear that the time required for the coiling operation is not dependent on the driving means of the device but depends on the formation of the coil itself.

If the device now described is to be used for producing a very high number of coils per time unit, some difficulty may arise caused by the fact that the movable roller 3 after finishing a coil has not yet returned in the proper place to catch a successive dough sheet.

This may lead to carrying off uncoiled sheets, which should be prevented.

In the embodiment according to Figures 1, 2, 3 after finishing a coil the shielding member 16 falls on the carrier 2, which may cause a rebounding of the mechanism connected to the plate 16.

These difficulties are overcome in the embodiment according to Figures 4–6, which therefore is most suitable for high capacity.

In Figs. 4–6 two rollers 32 and 33 are arranged over a carrier 31. The shaft 32a of the roller 32 in operation is stationary.

The roller 32 is driven clockwise by means of a chain 34 and a chain wheel 36 on the shaft 35.

The roller 33 has an angular cross-section and a higher peripheral speed than the roller 32. The use of this angular section in coiling is the same as described for roller 20 in the first example.

The roller 33 is supported in arms 37, rotatable about shaft 35 and connected to a chain wheel 38, which is also freely rotatable about shaft 35. The roller 33 is driven in clockwise direction by means of a chain wheel 39, a chain 40 and a chain wheel 41 fast on shaft 35.

A chain 42 leads from chain wheel 38 to chain wheel 43 fast on shaft 44. To said shaft 44 arms 45 are connected, between which there is a rod 46. A sleeve 47 surrounds said rod 46 and is connected to a plate shaped shielding member 48, having an extending part 49.

The bearing 50 is stationary in the machine frame.

In operation a sheet of dough a arrives in the direction p' and meets the roller 32 (Fig. 4). Coiling begins. The roller 33 starts its actions on the sheet of dough but when the coil of dough grows it urges the roller 33 in the direction of the arrow q', so that the arms 37 and the chain wheel 38 rotate about the shaft 35.

Consequently the arms 45 and the plate 48 are lowered. Towards the end of the coiling operation the lower edge of the plate 48 contacts the periphery of the coil and during rotation of the latter the plate 48 is moved towards the roller 33 (Fig. 5).

Hence the roller 33 is now shielded from the coiled sheet of dough by the plate 48 and the coil is carried off between the plate 48 and the roller 32 along the upper part of the roller 32 (Figure 6). In doing so the coil is pressed by the plate 48 because the extending part 49 of that plate 48 met the shaft 35.

It is to be understood that the invention is not limited to the particular constructions and arrangements of the illustrated embodiments of the invention but that the invention may be embodied in other forms within the scope of the claims.

Having explained the nature and objects of the invention and having specifically described constructions embodying the invention what I claim is:

1. In a device for coiling a sheet of dough a movable carrier for sheets of dough, two relatively movable shafts, two driven rollers being mounted on said shafts for cooperation with said carrier during coiling and forming together with the carrier a coiling chamber, the shaft of one roller being movable relatively to the shaft of the other roller under influence of the growing dough coil, means for driving said carrier and said rollers, a shielding member which is movable under influence of the relative motion of said shafts and adapted to bring one of said rollers, independently of said driving means, out of contact with the dough coil at the end of the coiling operation, said shielding member being suspended for coming, during its motion, into contact with the dough coil and for being driven by said dough coil towards the roller to be shielded to an extent sufficient to carry off the dough coil from said coiling chamber.

2. In a device for coiling a sheet of dough a movable carrier for sheets of dough, two relatively movable shafts, two driven rollers being mounted on said shafts for cooperation with said carrier during coiling and forming together with the carrier a coiling chamber, the shaft of one roller being movable relatively to the shaft of the other roller under influence of the growing dough coil, means for driving said rollers at a circumferential speed greater than the speed of the carrier, a shielding member which is movable under influence of the relative motion of said shafts and adapted to bring one of said rollers, independently of said driving means, out of contact with the dough coil at the end of the coiling operation, said shielding member being suspended for coming, during its motion, into contact with the dough coil and for being driven by said dough coil towards the roller to be shielded to an extent sufficient to carry off the dough coil from said coiling chamber.

3. In a device for coiling a sheet of dough a movable carrier for sheets of dough, a movable shaft situated over said carrier, a driven roller on said shaft and movable together with said shaft, a stationary shaft adjacent to said movable shaft, a driven roller on said shaft, said rollers being mounted for cooperation with said carrier during coiling and forming together with the carrier a coiling chamber, means for driving said carrier and said rollers, a movable shielding member, the motion of which is derived from the movable roller and from the motion and growing of the dough coil, and adapted to move towards the movable roller to an extent sufficient to bring the movable roller out of contact with the dough coil at the end of the coiling operation and to carry off the dough coil past the upper surface of the stationary roller from the coiling chamber.

4. In a device for coiling a sheet of dough a movable carrier for sheets of dough, a movable shaft situated over said carrier, a driven roller on said shaft and movable together with said shaft, a stationary shaft adjacent to said movable shaft, a driven roller on said shaft, said rollers being mounted for cooperation with said carrier during coiling and forming together with the carrier a coiling chamber, means for driving said carrier and said rollers, a movable shielding member, the motion of which is derived from the movable roller and from the motion and growing of the dough coil, said shielding member being suspended in the space between the two rollers and adapted to move towards the movable roller to an extent sufficient to bring the movable roller out of contact with the dough coil at the end of the coiling operation and to carry off the dough coil past the upper surface of the stationary roller from the coiling chamber.

5. A device according to claim 3 provided with means for pressing the shielding member at the end of its motion towards the outlet of the coiling chamber.

6. In a device for coiling a sheet of dough a movable carrier for sheets of dough a stationary shaft situated over said carrier, a driven roller on said shaft, a shaft adjacent to said stationary shaft, said shaft being movable relatively to the stationary shaft under influence of the growing dough coil, a driven roller on said shaft and movable together with said shaft, said rollers being mounted for cooperation with said carrier during coiling and forming together with the carrier a coiling chamber, means for driving said carrier and said rollers, a linkage connected to the roller on the movable shaft, a shielding member adjacent to said movable roller and suspended from said linkage for coming during its motion into contact with the dough coil and for being driven by said dough coil towards the movable roller to an extent sufficient to carry off the dough coil through the space between the carrier and the movable roller.

HENDRIK HERMAN
CHRISTIAAN PETERS.